US009434013B2

(12) United States Patent
Johnson et al.

(10) Patent No.: US 9,434,013 B2
(45) Date of Patent: Sep. 6, 2016

(54) SHEET CUTTING SHEARS

(71) Applicant: Ingersoll-Rand Company, Davidson, NC (US)

(72) Inventors: Joshua Odell Johnson, Allentown, PA (US); Christopher Anthony Kokinelis, Flemington, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 297 days.

(21) Appl. No.: 13/713,419

(22) Filed: Dec. 13, 2012

(65) Prior Publication Data

US 2014/0165410 A1    Jun. 19, 2014

(51) Int. Cl.
B23D 27/04    (2006.01)
B23D 29/02    (2006.01)
B25F 5/02    (2006.01)

(52) U.S. Cl.
CPC ............... B23D 29/026 (2013.01); B25F 5/02 (2013.01); *B23D 27/04* (2013.01); *B23D 29/02* (2013.01)

(58) Field of Classification Search
CPC .......... B26B 19/00; B23P 19/04; B25F 5/02; B23D 29/026; B23D 27/04; B23D 29/02
USPC .................. 30/228, 312, 517–525, 369–394; 173/169, 162.2
See application file for complete search history.

(56) References Cited

U.S. PATENT DOCUMENTS

| 513,953 | A | 1/1894 | Newell |
| 1,693,301 | A | 11/1928 | Kopp |
| 1,765,313 | A | 6/1930 | Steindorff et al. |
| 2,652,626 | A | 9/1953 | Dutcher |
| 2,709,300 | A | 5/1955 | Blomberg et al. |
| 3,178,816 | A * | 4/1965 | Schmid ............ 30/228 |
| 3,693,254 | A | 9/1972 | Salonen |
| 3,787,742 | A | 1/1974 | Murphy |
| 3,956,824 | A | 5/1976 | Francis |

(Continued)

FOREIGN PATENT DOCUMENTS

| CN | 102712086 A | 10/2012 |
| EP | 0826330 B1 | 2/2002 |

(Continued)

OTHER PUBLICATIONS

State Intellectual Property Office of the People's Republic of China, First Office Action for Chinese Application No. 201310671983.7, dated Nov. 4, 2015, 8 pages (including partial translation).

*Primary Examiner* — Kenneth E. Peterson
*Assistant Examiner* — Nhat Chieu Do
(74) *Attorney, Agent, or Firm* — Barnes & Thornburg LLP

(57) ABSTRACT

Illustrative embodiments of sheet cutting shears are disclosed. A sheet cutting shears may include a tool body and a cutting head. The tool body may include a drive housing and a handle coupled to the drive housing. The handle may be inclined toward the cutting head so that at least a portion of the drive housing located between the handle and the cutting head is within a footprint of the handle when viewed from above. A handle axis and a housing axis may form an acute angle located at least in part between a front side of the handle and a top side of the drive housing. The sheet cutting sheers may further include a trigger configured to move between an off position and an on position, the trigger being spaced apart from the drive housing.

14 Claims, 4 Drawing Sheets

(56) References Cited

U.S. PATENT DOCUMENTS

| | | |
|---|---|---|
| 4,075,760 A | 2/1978 | Germain |
| 4,084,123 A | 4/1978 | Lineback et al. |
| 4,593,466 A | 6/1986 | O'Brien |
| 4,707,921 A | 11/1987 | Meyer et al. |
| 4,998,351 A | 3/1991 | Hartmeister |
| 5,867,909 A | 2/1999 | Jeltsch et al. |
| 5,901,447 A * | 5/1999 | Dunning ................. 30/228 |
| 6,178,643 B1 | 1/2001 | Erbrick et al. |
| 6,938,531 B2 | 9/2005 | Yoshimizu et al. |
| 7,020,967 B2 | 4/2006 | Kimura |
| 7,096,974 B2 * | 8/2006 | Obermeier et al. ......... 173/217 |
| 7,178,248 B2 | 2/2007 | Richards |
| 7,971,360 B2 | 7/2011 | Clark et al. |
| 8,136,559 B2 | 3/2012 | Rosenau et al. |
| 2002/0066447 A1 | 6/2002 | Gaidjiergis et al. |
| 2004/0106036 A1* | 6/2004 | Geis et al. ................. 429/99 |
| 2004/0118257 A1 | 6/2004 | Kratzmaier |
| 2005/0115081 A1* | 6/2005 | Tu ............................. 30/228 |
| 2006/0213343 A1* | 9/2006 | Edwards et al. .............. 83/13 |
| 2010/0252293 A1* | 10/2010 | Lopano et al. ............. 173/170 |

FOREIGN PATENT DOCUMENTS

| | | |
|---|---|---|
| EP | 1440756 A1 | 7/2004 |
| EP | 2286659 A1 | 2/2011 |

* cited by examiner

SHEET CUTTING SHEARS

TECHNICAL FIELD

The present disclosure relates, generally, to shears for cutting sheets, plates, or panels of material (i.e., "sheet cutting shears"). More particularly, the present disclosure relates ergonomic designs for sheet cutting shears.

BACKGROUND

Sheet cutting shears are handheld tools used for cutting sheets, plates, or panels of material such as, by way of example, metal, plastic, or composite materials. In particular, some sheet cutting shears are used to make cuts into steel and aluminum sheets. Sheet cutting shears may be manual or powered by electricity, compressed air, or other suitable power sources. Sheet cutting shears are often used by body shops, sheet metal fabricators, air conditioning system fabricators, plastic fabricators, heating contractors, and machine shops. Sometimes, electrically powered sheet cutting shears draw power from a battery so that the shears may be cordlessly operated.

SUMMARY

According to one aspect of the present disclosure, a sheet cutting shears may include a tool body and a cutting head. The tool body may include a drive housing and a handle coupled to the drive housing. The handle may extend from the drive housing at a first end of the drive housing. The cutting head may be coupled to the drive housing at a second end of the drive housing, the second end being opposite the first end. The cutting head may include a jaw and a blade coupled to the jaw. The blade may be pivotable relative to the jaw. The handle may be inclined toward the cutting head so that at least a portion of the drive housing located between the handle and the cutting head is within a footprint of the handle when viewed from above.

In some embodiments, the sheet cutting shears may also include a battery. The battery may be coupled to the handle and spaced apart from the drive housing. At least a portion of the cutting head may be within a footprint of the battery when viewed from above. A center of gravity of the sheet cutting shears may also be within a footprint of the battery when viewed from above.

In some embodiments, the sheet cutting shears may also include a switch. The switch may be coupled to the handle and spaced apart from the drive housing. The switch may be configured to move between an off position and an on position. The switch may be a trigger that is slidable between the off position and the on position. The trigger may be biased toward the off position by a spring.

In some embodiments, the handle may include a battery receiver and a hand grip. The battery receiver may be configured to receive at least a portion of the battery. The hand grip may include a proximal end adjacent the drive housing and a distal end adjacent the battery receiver. The trigger may be coupled to the distal end of the hand grip.

According to another aspect of the present disclosure, a sheet cutting shears may include a tool body and a cutting head. The tool body may include a drive housing and a handle coupled to a top side of the drive housing. The drive housing may extend along a housing axis and the handle may extend along a handle axis. The cutting head may be coupled to the drive housing and spaced apart from the handle. The cutting head may include a jaw and a blade coupled to the jaw. The blade may be pivotable about a blade axis relative to the jaw. The handle may have a front side facing the cutting head. The handle axis and the housing axis may form an acute angle located at least in part between the front side of the handle and the top side of the drive housing.

In some embodiments, the sheet cutting shears may also include a switch coupled to the handle and spaced apart from the drive housing. The switch may be configured to move between an off position and an on position. The switch may be a trigger coupled to the front side of the handle. The trigger may be slidable relative to the handle along a trigger axis between the off position and the on position. The trigger axis may be parallel to the housing axis.

In some embodiments, the sheet cutting shears may also include a battery. The handle may be formed to include a hand grip and a battery receiver. The battery receiver may be configured to receive at least a portion of the battery. The hand grip may have a proximal end adjacent the drive housing and a distal end adjacent the battery receiver. The trigger may be coupled to the hand grip at the distal end of the hand grip.

In some embodiments, the battery may be configured to move along a battery-installation axis from a disengaged position, entirely outside of the battery receiver, to an engaged position, at least partially received in the battery receiver. The battery-installation axis may be parallel to and spaced apart from the housing axis. The trigger axis may be substantially parallel to the housing axis and may be located between the housing axis and the battery-installation axis. The blade axis may be perpendicular to the housing axis and may be spaced apart from the housing axis.

In some embodiments, the jaw may include a first finger and a second finger spaced apart from the first finger. The blade may be located between the first finger and the second finger.

According to yet another aspect of the present disclosure, sheet cutting shears may include a tool body, a cutting head, and a trigger. The tool body may include a drive housing and a hand grip. The drive housing may extend along a housing axis. The hand grip may be coupled to the drive housing and may extend from a top side of the drive housing along a handle axis. The cutting head may be coupled to the drive housing. The cutting head may include a jaw and a blade coupled to the jaw. The blade may be pivotable relative to the jaw. The trigger may be coupled to the hand grip and configured to move between an off position and an on position. The trigger may be spaced apart from the drive housing.

In some embodiments, the hand grip may have a proximal end adjacent the drive housing and a distal end spaced apart from the drive housing. The trigger may be coupled to the hand grip at the distal end of the hand grip.

In some embodiments, the hand grip may have a front side facing the cutting head. The handle axis and the housing axis may form a first angle located at least in part between the front side of the hand grip and the top side of the drive housing. The first angle may be acute.

In some embodiments, the handle axis and the trigger axis may form a second angle located at least in part between the trigger axis and the front side of the hand grip. The second angle may be a complement of the first angle.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
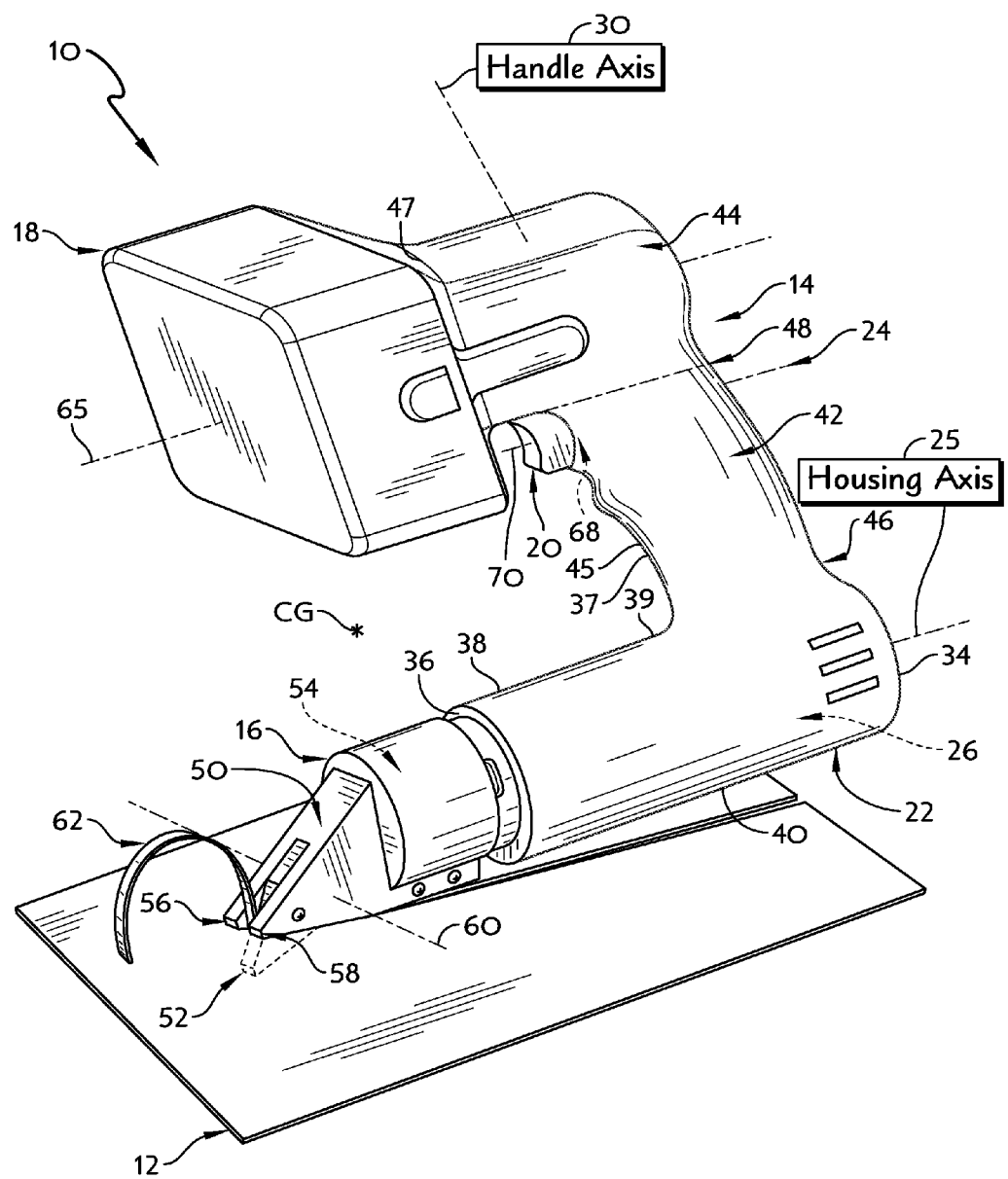
FIG. 1 is a perspective view of at least one illustrative embodiment of a sheet cutting shears cutting a metal sheet.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Referring now to FIG. 1, an illustrative handheld tool is shown in the form of a sheet cutting shears 10 along with a work piece (illustratively, a sheet of metal 12) being cut by the shears 10. The shears 10 illustratively includes a tool body 14, a cutting head 16, a battery 18, and a switch 20. The tool body 14 supports the cutting head 16, the battery 18, and the switch 20, as shown in FIG. 1. In the illustrative embodiment, the tool body 14 is shaped to support the battery 18 above the sheet of metal 12 being cut by the cutting head 16, while providing an ergonomic hand grip 42 also located above the sheet of metal 12 as shown in FIG. 1.

Figure 2:
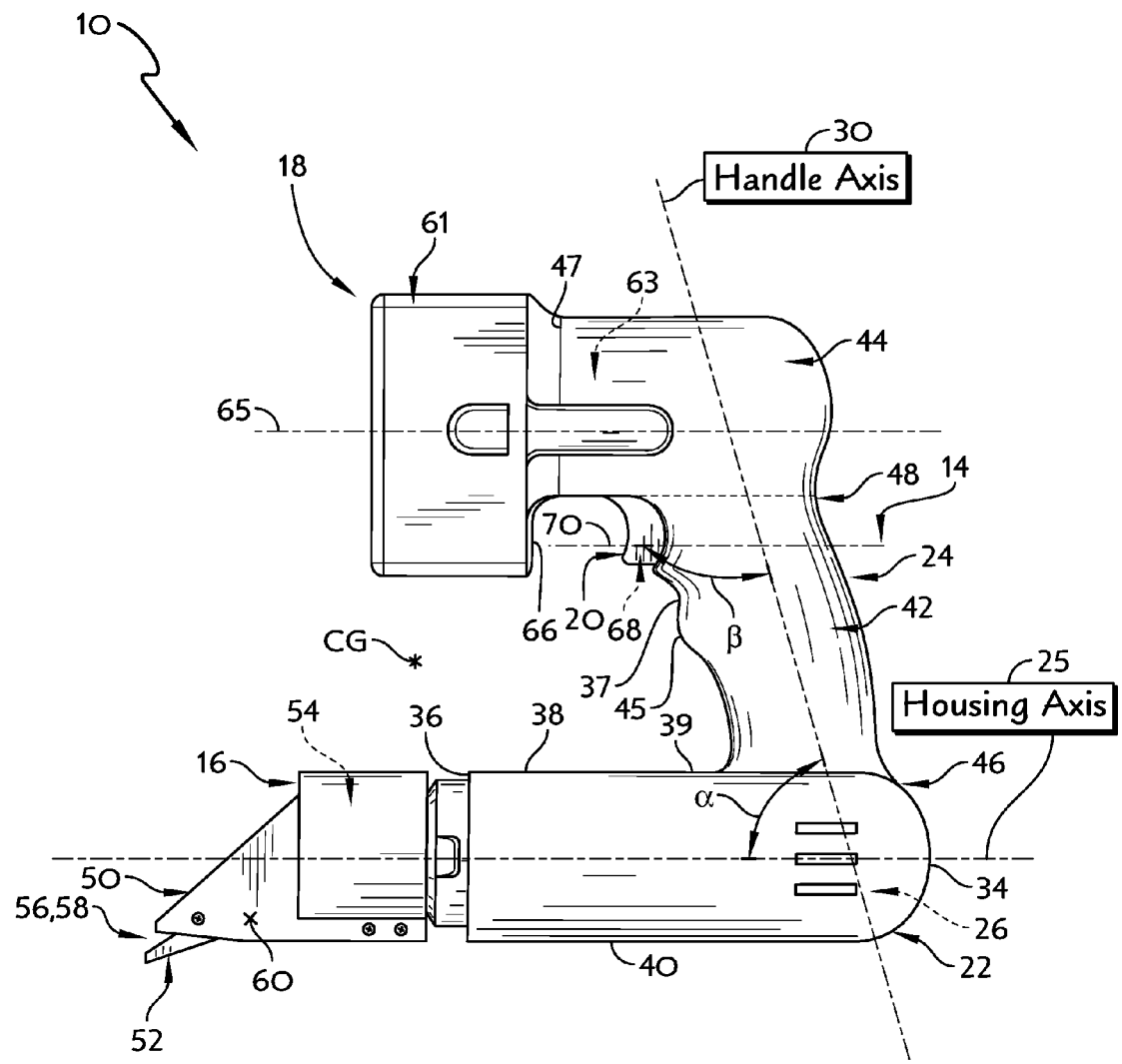
FIG. 2 is a side elevation view of the sheet cutting shears of FIG. 1.

Turning to FIG. 2, the tool body 14 illustratively includes a drive housing 22 and a handle 24. The drive housing 22 extends along a housing axis 25 and encases a drive 26 configured to drive the cutting head 16. The handle 24 extends from the drive housing 22 along a handle axis 30. The handle 24 is inclined relative to the drive housing 22 so that the handle 24 extends over the drive housing 22 to be ergonomically held by a user cutting a sheet of metal 12 that underlies the tool body 14, as shown in FIG. 1. In the illustrative embodiment, the handle axis 30 is fixed relative to the housing axis 25 (i.e., the handle 24 is not rotatable relative to the drive housing 22).

The drive housing 22 has a first end 34, a second end 36 (opposite the first end 34), a top side 38, and a bottom side 40 (opposite the top side 38), as shown in FIG. 2. The handle 24 extends from the top side 38 of the drive housing 22 at the first end 34 of the drive housing 22. The cutting head 16 is coupled to the second end 36 of the drive housing 22. As the handle 24 extends from the drive housing 22, the handle 24 is inclined toward the cutting head 16 so that the handle axis 30 and the housing axis 25 form an angle α as shown, for example, in FIG. 2. In the illustrative embodiment, the angle α is an acute angle positioned, at least in part, between a front side 37 of the handle 24 and the top side 38 of the drive housing 22. Thus, a portion 39 of the drive housing 22, located between the handle 24 and the cutting head 16, is within a footprint of the handle 24 when viewed from above, as shown in FIGS. 2 and 3.

The handle 24 illustratively includes a hand grip 42 and a battery receiver 44, as shown, for example, in FIG. 2. The hand grip 42 is sized to be gripped by one hand of a user holding the shears 10 and, illustratively, has a forward side 45 facing the cutting head 16 that is contoured to receive a user's fingers. The hand grip 42 has a proximal end 46 coupled to the top side 38 of the drive housing 22 at the first end 34 of the drive housing 22 and a distal end 48 spaced apart from the drive housing 22. The battery receiver 44 is configured to receive a portion of the battery 18 when the battery 18 is coupled to the tool body 14. The battery receiver 44 is coupled to the distal end of the hand grip 42 and is spaced apart from the drive housing 22.

Figure 3:
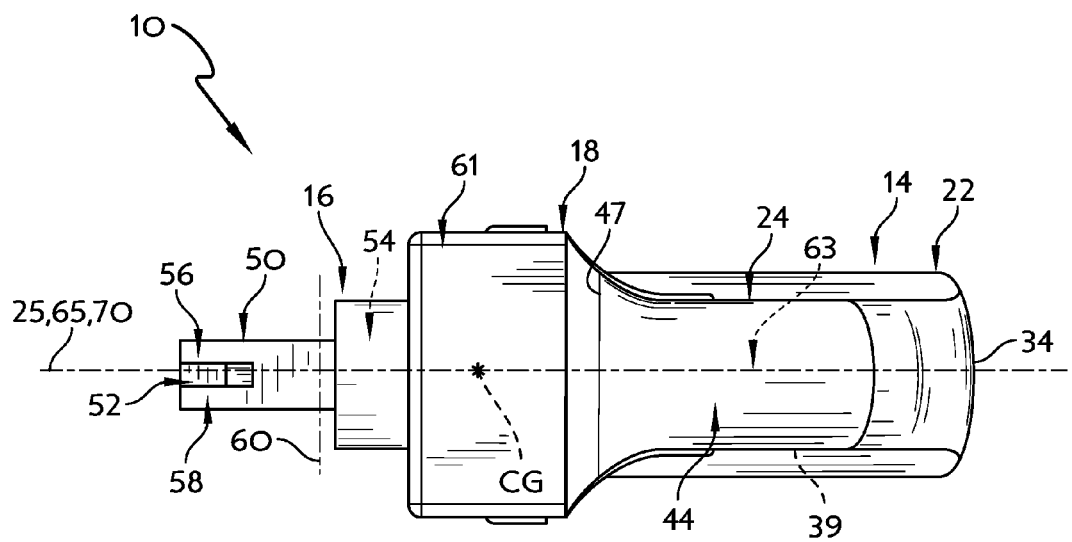
FIG. 3 is a top plan view of the shears of FIGS. 1 and 2.

In the illustrative embodiment of FIGS. 1-3, the battery receiver 44 is formed to include a forwardly-opening aperture 47 facing the cutting head 16. The forwardly-opening aperture 47 is sized to allow a portion of the battery 18 to enter the battery receiver 44 when the battery 18 is coupled to the tool body 14.

The drive 26 is illustratively an electric motor adapted to be powered by the battery 18. In other embodiments, the drive 26 may be an electric motor adapted to be powered by a wall outlet, a pneumatic drive adapted to be powered by compressed air, or any other suitable rotational drive.

The cutting head 16 is coupled to the drive housing 22 and is configured to cut a sheet of metal 12 positioned below the bottom side 40 of the drive housing 22, as shown in FIG. 1. In other embodiments, the cutting head 16 may be rotatable relative to the drive housing 22 about the housing axis 25 to cut sheets of metal 12 positioned along different sides of the drive housing 22. The cutting head 16 illustratively includes a jaw 50, a blade 52, and a gearbox 54, as shown in FIG. 2. The jaw 50 includes a left finger 56 and a right finger 58, as shown in FIG. 1. The blade 52 is coupled to the jaw 50 and is pivotable relative to the jaw 50 about a blade axis 60. The gearbox 54 is coupled to the drive 26 and to the blade 52. The gearbox 54 is configured to cause the blade 52 to move back and forth in response to rotation of the drive 26 in a single direction.

The blade 52 is located between the left finger 56 and the right finger 58 of the jaw 50. In operation, the blade 52 pivots back and forth relative to the jaw 50 about the blade axis 60 from a first position extending downwardly and out from between the fingers 56, 58 to a second position extending between the fingers 56, 58. The fingers 56, 58 are each formed to define a shearing edge configured to provide a shearing force across the sheet of metal 12 when the blade 52 moves from the first position to the second position, such that a strip of metal 62 may be sheared between the jaw 50 and the blade 52 from the sheet of metal 12 so that the sheet of metal 12 is cut, as suggested in FIG. 1. The blade axis 60 is located below and extends perpendicular to the housing axis 25, as shown in FIGS. 1 and 2.

The battery 18 provides a power supply that may be removably coupled to the tool body 14 for powering the cutting head 16 to make the shears 10 cordless. In the illustrative embodiment, the battery 18 is coupled to the battery receiver 44 and is spaced apart from the drive housing 22. The battery 18 is positioned, at least in part, over the cutting head 16 so that at least a portion of the cutting head 16 is within a footprint of the battery 18 when viewed from above, as shown in FIG. 3. Additionally, in the illustrative embodiment, a center of gravity CG of the shears 10 is located below the battery 18 and is within a footprint of the battery 18 when viewed from above, as shown in FIGS. 2 and 3.

The battery 18 is illustratively embodied as a lithium-based rechargeable battery but, in other embodiments, may be any other suitable type of battery. The battery 18 includes a body 61 and a stem 63, as shown in FIG. 2. The body 61 of the battery 18 is arranged to extend downwardly from the battery receiver 44 along the hand grip 42, in spaced apart relation to the hand grip 42, to form a trigger guard 66. The stem 63 of the battery 18 is received in the battery receiver 44 to couple the battery 18 to the tool body 14, as shown in FIG. 2.

The battery 18 is configured to move along a battery-installation axis 65 from a disengaged position to an engaged position, as suggested in FIGS. 1 and 2. In the disengaged position, the stem 63 of the battery 18 is located outside of the battery receiver 44. In the engaged position, the stem 63 of the battery 18 is received in the battery receiver 44, as shown in FIGS. 1 and 2. In other embodiments, the battery 18 may be fully received in the battery receiver 44. The battery-installation axis 65 is located above and is parallel to the housing axis 25, as shown in FIGS. 1 and 2.

The switch 20 is illustratively embodied as a trigger 20 coupled to the hand grip 42 of the handle 24, as shown in FIGS. 1 and 2. The trigger 20 is positioned along the forward side 45 of the hand grip 42 at the distal end 48 of the hand grip 42. The trigger 20 is slidable relative to the hand grip 42 along a trigger axis 70 to move between an off position and an on position, in response to a user pressing the trigger 20. When the trigger 20 is in the off position, the battery 18 is electrically disconnected from the drive 26. When the trigger 20 is in the on position, the battery 18 is electrically connected to the drive 26, so that the cutting head 16 is driven by the drive 26. In the illustrative embodiment, the trigger 20 is illustratively biased toward the off position by a bias spring 68 positioned in compression between the trigger 20 and the handle 24.

In the illustrative embodiment, the trigger axis 70 is located between the housing axis 25 and the battery-installation axis 65, as shown in FIG. 2. The trigger axis 70 is also is parallel to and coplanar with the housing axis 25 and the battery-installation axis 65, as shown in FIGS. 2 and 3. The trigger axis 70 and the handle axis 30 form an angle β located at least in part between the trigger axis 70 and the forward side 45 of the hand grip 42. The second angle β is illustratively obtuse and is a complement to the angle α formed by the housing axis 25 and the handle axis 30, as shown in FIG. 2. It will be appreciated that, in other embodiments of the shears 10, the switch 20 may be embodied as any type of user input device suitable for controlling operation of the drive 26 of the shears 10.

Figure 4:
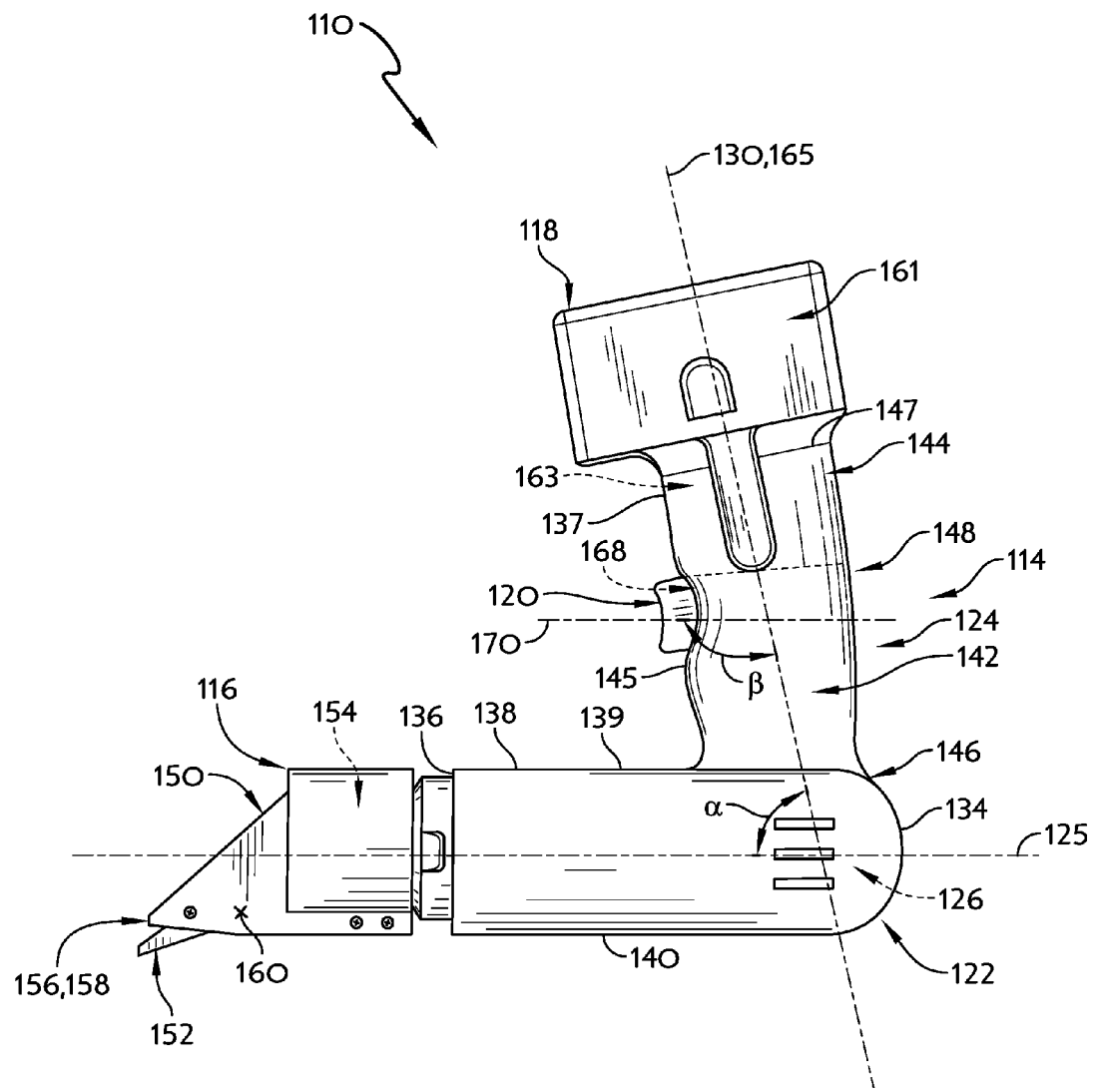
FIG. 4 is a side elevation view of another illustrative embodiment of a sheet cutting shears.

Referring now to FIG. 4, another illustrative handheld tool is shown in the form of a sheet cutting shears 110. Many of the features of the shears 110 are generally similar to the features of the shears 10 described above. Such features of the shears 110 are indicated by reference numbers ending in the same two digits as the reference numbers used to describe shears 10 (such as reference numbers 112, 114, 116, 118, 120, 122, 124, 125, 126, 130, 134, 136, 137, 138, 139, 140, 142, 144, 145, 146, 147, 148, 150, 152, 154, 156, 158, 160, 161, 162, 163, 165, 166, 168, and 170). Illustrative differences between the shears 110 and the shears 10 are described below.

The shears 110 includes a battery receiver 144 forming an upwardly-opening aperture 147, as shown in FIG. 4. The orientation of the aperture 147 causes the battery 118 to be moved along a battery-installation axis 165 that is co-linear with the handle axis 130. As a result of the orientation of the battery receiver 144 in this embodiment, the cutting head 116 of the shears 110 is not located within the footprint of the battery 118 when viewed from above.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A sheet cutting shears comprising:
a tool body including a drive housing and a handle, the handle extending upwardly from the drive housing at a first end of the drive housing, the drive housing extending along a housing axis and the handle extending along a handle axis,
a cutting head coupled to the drive housing at a second end of the drive housing, the second end opposite the first end, the cutting head including a jaw and a blade coupled to the jaw, the jaw including a first finger and a second finger spaced apart from the first finger, the blade positioned between the first and second fingers and pivotable relative to the jaw about a blade axis,
wherein the handle is inclined toward the cutting head to form an acute angle relative to the drive housing, the handle includes a hand grip and a battery receiver, the hand grip has a proximal end adjacent the drive housing and a distal end spaced apart from the drive housing, the battery receiver extends from the distal end of the hand grip along a battery-installation axis, the battery-installation axis is substantially parallel to and spaced apart from the housing axis, the blade is movable between a first position where the blade extends between the first and second fingers and a second position where the blade extends downwardly and out from between the fingers below the blade axis, and the first and second fingers are each formed to define a shearing edge configured to provide a shearing force when the blade moves from the second position to the first position, and
a battery at least partially received in the battery receiver of the handle and spaced apart from the drive housing, wherein at least a portion of the cutting head is within a footprint of the battery when viewed from the battery along a line perpendicular to the housing axis.

2. The sheet cutting shears of claim 1, wherein a center of gravity of the sheet cutting shears is within the footprint of the battery when viewed from the battery along a line perpendicular to the housing axis.

3. The sheet cutting shears of claim 2, wherein the center of gravity of the sheet cutting shears is located between the housing axis and the battery-installation axis.

4. The sheet cutting shears of claim 1, further comprising a switch coupled to the handle and spaced apart from the drive housing, the switch configured to move between an off position and an on position.

5. The sheet cutting shears of claim 4, wherein the switch is a trigger slidable between the off position and the on position, the trigger biased toward the off position by a spring.

6. The sheet cutting shears of claim 5, wherein the trigger is slidable relative to the handle along a trigger axis between the off position and the on position, the trigger axis being parallel to the housing axis.

7. The sheet cutting shears of claim 1, wherein the battery is configured to move along the battery-installation axis from a disengaged position, entirely outside of the battery receiver, to an engaged position, at least partially received in the battery receiver.

8. The sheet cutting shears of claim 1, wherein the blade axis is perpendicular to the housing axis and is spaced apart from the housing axis.

9. A sheet cutting shears comprising:
- a tool body including a drive housing that extends along a housing axis and a hand grip that extends upwardly from a top side of the drive housing at a first end of the drive housing along a handle axis,
- a cutting head coupled to the drive housing at a second end of the drive housing, the second end opposite the first end, the cutting head including a jaw and a blade coupled to the jaw, the jaw including a first finger and a second finger spaced apart from the first finger, the blade positioned between the first and second fingers and pivotable relative to the jaw about a blade axis,
- a trigger coupled to the hand grip and configured to move between an off position and an on position along a trigger axis parallel to the housing axis, the trigger being spaced apart from the drive housing,
- wherein the hand grip is inclined toward the cutting head so that at least a portion of the drive housing located between the hand grip, the blade is movable between a first position where the blade extends between the first and second fingers and a second position where the blade extends downwardly and out from between the fingers below the blade axis, and the first and second fingers are each formed to define a shearing edge configured to provide a shearing force when the blade moves from the second position to the first position, and
- a battery at least partially received in a battery receiver of the hand grip and spaced apart from the drive housing, wherein at least a portion of the cutting head is within a footprint of the battery when viewed from the battery along a line perpendicular to the housing axis.

10. The sheet cutting shears of claim 9, wherein the hand grip has a proximal end adjacent the drive housing and a distal end spaced apart from the drive housing, the trigger being coupled to the hand grip at the distal end of the hand grip.

11. The sheet cutting shears of claim 10, wherein the hand grip has a forward side facing the cutting head, the handle axis and the housing axis forming a first angle located at least in part between the forward side of the hand grip and the top side of the drive housing, the first angle being acute.

12. The sheet cutting shears of claim 11, wherein the handle axis and the trigger axis form a second angle located at least in part between the trigger axis and the forward side of the hand grip, the second angle being a complement of the first angle.

13. The sheet cutting shears of claim 12, wherein the hand grip and the drive housing are unitary.

14. The sheet cutting shears of claim 9, wherein the hand grip is positioned to extend from the drive housing above the blade axis.

* * * * *